United States Patent
Chin et al.

(10) Patent No.: US 9,898,130 B2
(45) Date of Patent: Feb. 20, 2018

(54) GRIP MANAGEMENT

(71) Applicant: Synaptics Incorporated, San Jose, CA (US)

(72) Inventors: Kerry Chin, San Jose, CA (US); Sushil Anand, San Jose, CA (US); Divya Laguduvan, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 21 days.

(21) Appl. No.: 15/087,692

(22) Filed: Mar. 31, 2016

(65) Prior Publication Data
US 2017/0285834 A1    Oct. 5, 2017

(51) Int. Cl.
    *G06F 3/044*      (2006.01)
    *G06F 3/041*      (2006.01)

(52) U.S. Cl.
CPC ............ *G06F 3/0416* (2013.01); *G06F 3/044* (2013.01); *G06F 3/0412* (2013.01); *G06F 3/0414* (2013.01)

(58) Field of Classification Search
CPC ...... G06F 3/041; G06F 3/0412; G06F 3/0414; G06F 3/0416; G06F 3/044; G06F 3/0487; G06F 2203/04105
See application file for complete search history.

(56) References Cited

U.S. PATENT DOCUMENTS

| | | | |
|---|---|---|---|
| 2010/0248822 A1* | 9/2010 | Migos | A63F 13/06 463/29 |
| 2013/0300668 A1 | 11/2013 | Churikov et al. | |
| 2013/0321337 A1 | 12/2013 | Graham et al. | |
| 2014/0027606 A1 | 1/2014 | Raynor et al. | |
| 2014/0125612 A1 | 5/2014 | Park et al. | |
| 2014/0160010 A1* | 6/2014 | Jung | G06F 3/0414 345/156 |
| 2014/0317722 A1 | 10/2014 | Tartz et al. | |
| 2014/0340338 A1* | 11/2014 | Kim | G06F 3/0488 345/173 |
| 2014/0370938 A1* | 12/2014 | Lee | H04M 1/72583 455/566 |
| 2015/0161369 A1 | 6/2015 | Weksler et al. | |
| 2015/0205400 A1 | 7/2015 | Hwang et al. | |

FOREIGN PATENT DOCUMENTS

CA      2821083 A1    1/2014

\* cited by examiner

*Primary Examiner* — Jennifer Mehmood
*Assistant Examiner* — Sardis F Azongha
(74) *Attorney, Agent, or Firm* — Osha Liang LLP

(57) ABSTRACT

Grip management includes determining, using first changes of capacitance of a sensing region of an input device, a first signal level corresponding to a first input object satisfying a size threshold and being proximate to a first side of the input device at a first time, and determining a first signal level threshold based on the first signal level. The grip management further includes determining, using second changes of capacitance of the sensing region, a second signal level corresponding to the first input object being proximate to the first side of the input device at a second time, and detecting a squeeze of the input device based at least in part on the second signal level satisfying the first signal level threshold.

18 Claims, 5 Drawing Sheets

GRIP MANAGEMENT

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a processing system configured for grip management, the processing system including sensor circuitry and processing circuitry. The sensor circuitry has functionality to acquire, using multiple sensor electrodes, first changes of capacitance of a sensing region of an input device, and acquire second changes of capacitance of the sensing region using the sensor electrodes. The processing circuitry has functionality to determine, using the first changes, a first signal level corresponding to an input object satisfying a size threshold and being proximate to a side of the input device at a first time, and determine a signal level threshold based on the first signal level. The processing circuitry further has functionality to determine, using the second changes, a second signal level corresponding to the input object being proximate to the side of the input device at a second time, and detect a squeeze of the input device based at least in part on the second signal level satisfying the signal level threshold.

In general, in one aspect, one or more embodiments relate to a method for grip management. The method includes determining, using first changes of capacitance of a sensing region of an input device, a first signal level corresponding to a first input object satisfying a size threshold and being proximate to a first side of the input device at a first time, and determining a first signal level threshold based on the first signal level. The method further includes determining, using second changes of capacitance of the sensing region, a second signal level corresponding to the first input object being proximate to the first side of the input device at a second time, and detecting a squeeze of the input device based at least in part on the second signal level satisfying the first signal level threshold.

In general, in one aspect, one or more embodiments relate to an input device for grip management including multiple sensor electrodes and a processing system. The processing system is configured to acquire, using multiple sensor electrodes, first changes of capacitance of a sensing region of an input device, determine, using the first changes, a first signal level corresponding to a first input object satisfying a size threshold and being proximate to a first side of the input device at a first time, and determine a first signal level threshold based on the first signal level. The processing system is further configured to acquire second changes of capacitance of the sensing region using the sensor electrodes, determine, using the second changes, a second signal level corresponding to the first input object being proximate to the first side of the input device at a second time, and detect a squeeze of the input device based at least in part on the second signal level satisfying the first signal level threshold.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments are directed to grip management. Grip management includes determining whether a grip is being performed on an input device. Grip management further includes detecting when the grip is a squeeze of the input device.

Figure 1:
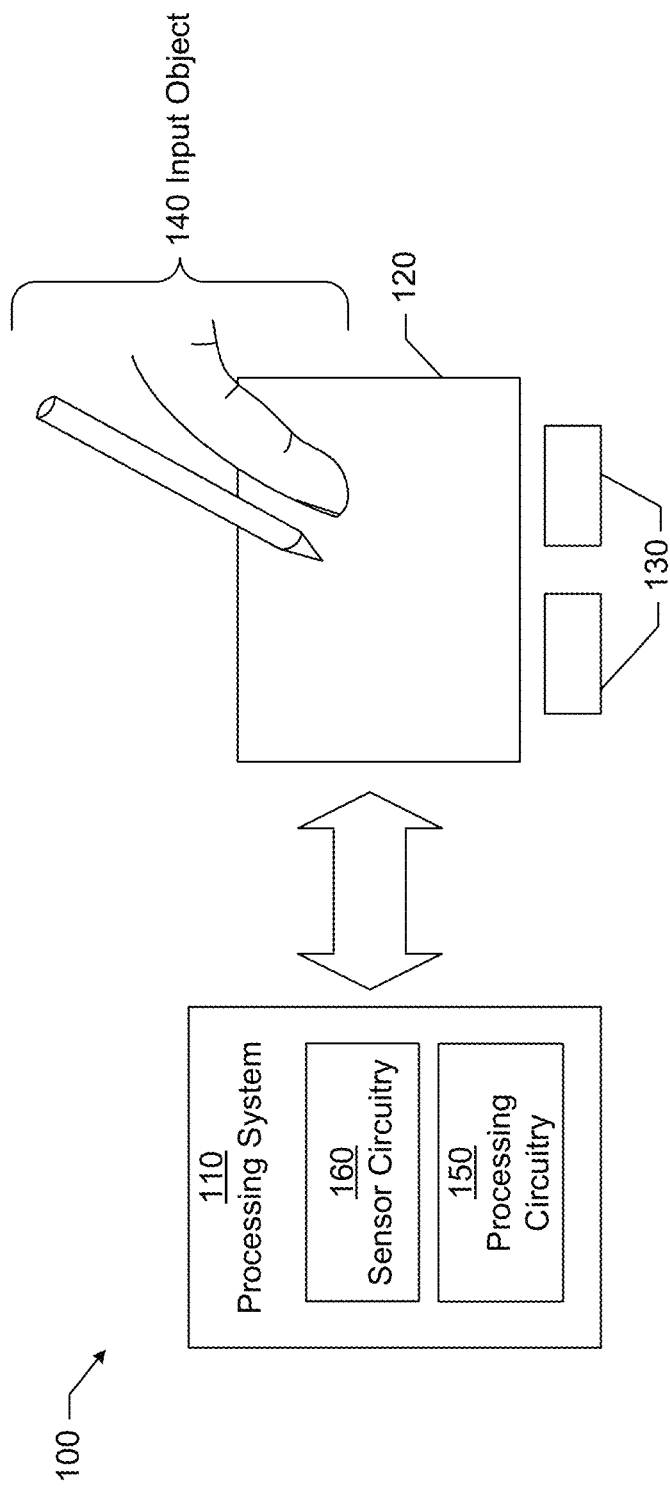
FIGS. 1 and 2 are a block diagram of example systems that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the processing system may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In other embodiments, one or more of sensor electrodes are disposed on the same side or surface of the common substrate and are isolated from each other in the sensing region. The sensor electrodes may be disposed in a matrix array where each sensor electrode may be referred to as a matrix sensor electrode. The matrix array may correspond to a grid pattern. Each sensor electrode of sensor electrodes may be substantially similar in size and/or shape. In one embodiment, one or more of the sensor electrodes of the matrix array of sensor electrodes may vary in at least one of the size and shape. Each sensor electrode of the matrix array may correspond to a pixel of a capacitive image (i.e., capacitive pixel). Further, two or more sensor electrodes of the matrix array may correspond to a pixel of a capacitive image (i.e., capacitive pixel). In other words, a capacitive pixel is a location at which a measurement is acquired. In various embodiments, each sensor electrode of the matrix array may be coupled to a separate capacitive routing trace of a plurality of capacitive routing traces. In various embodiments, the sensor electrodes include one or more gird electrodes disposed between at least two sensor electrodes of the sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. Although the sensor electrodes may be electrically isolated on the substrate, the electrodes may be coupled together outside of the sensing region (e.g., in a connection region). In one or more embodiments, a floating electrode may be disposed between the grid electrode and the sensor electrodes. In one particular embodiment, the floating electrode, the grid electrode and the sensor electrode include the entirety of a common electrode of a display device.

In any sensor electrode arrangement (e.g., the matrix array described above), the sensor electrodes may be operated by the input device for mutual capacitive sensing by dividing the sensor electrodes into transmitter and receiver electrodes. As another example, in any sensor electrode arrangement (e.g., the matrix array described above), the sensor electrodes may be operated by the input device for absolute capacitive sensing. As another example, in any sensor electrode arrangement, a mixture of absolute and mutual capacitance sensing may be used. Further, one or more of the sensor electrodes or the display electrodes (e.g., source, gate, or reference (Vcom) electrodes) may be used to perform shielding.

A set of measurements from the capacitive pixels form a capacitive frame. In other words, the capacitive frame represents the set of measurements acquired for a moment in time. The measurements include effects of the capacitance, an input object in the sensing region, and any background capacitance. The capacitive frame may include a capacitive image that is representative of the capacitive couplings at the pixels and/or include a capacitive profile that is representative of the capacitive couplings or along each sensor electrode. Multiple capacitive frames may be acquired over multiple time periods, and differences between them may be used to derive information about input in the sensing region. For example, successive capacitive frames acquired over successive periods of time can be used to track the motion(s) of one or more input objects entering, exiting, and within the sensing region.

The background capacitance of a sensor device is the capacitive frame associated with no input object in the sensing region. The background capacitance changes with the environment and operating conditions, and may be estimated in various ways. For example, some embodiments take "baseline frames" when no input object is determined to be in the sensing region, and use those baseline frames as estimates of their background capacitances.

Capacitive frames can be adjusted for the background capacitance of the sensor device for more efficient processing. Some embodiments accomplish this by "baselining" measurements of the capacitive couplings at the capacitive pixels to produce "baselined capacitive frames." That is, some embodiments compare the measurements forming capacitance frames with appropriate "baseline values" of "baseline frames", and determine changes from that baseline image.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include processing circuitry (150) and sensor circuitry (160). The processing circuitry (150) may correspond to hardware circuitry, such as a central processing unit, an application specific integrated circuit, or other hardware. The processing circuitry (150) may include functionality to detect a presence of moisture, operate based on the presence of moisture, determine when at least one input object is in a sensing region, determine signal to noise ratio, determine positional information of an input object, identify a gesture, determine an action to perform based on the gesture, a combination of gestures or other information, perform other operations, and/or perform any combination of operations.

The sensor circuitry (160) may correspond to hardware circuitry, such as a central processing unit, an application specific integrated circuit, or other hardware that includes functionality to drive the sensor electrodes. For example, the sensor module (160) may include sensory circuitry that is coupled to the sensing elements.

Although FIG. 1 shows the processing circuitry (150) and the sensor circuitry (160) as separate components, all or part of the processing circuitry (150) may be the same as the sensor circuitry (160). Further, although FIG. 1 shows only processing circuitry (150) and sensor circuitry (160), alternative or additional hardware circuitry may exist in accordance with one or more embodiments of the invention. Such alternative or additional circuitry may correspond to distinct circuitry or sub-circuitry than one or more of the circuitry discussed above. Example alternative or additional circuitry includes hardware operation circuitry for operating hardware such as sensor electrodes and display screens, data processing circuitry for processing data such as sensor signals and positional information, reporting circuitry for reporting information, and identification circuitry configured to identify gestures, such as mode changing gestures, and mode changing circuitry for changing operation modes. Further, the various circuitry may be combined in separate integrated circuits. For example, a first circuitry may be comprised at least partially within a first integrated circuit, and a separate circuitry may be comprised at least partially within a second integrated circuit. Further, portions of a single circuitry may span multiple integrated circuits. In some embodiments, the processing system as a whole may perform the operations of the various circuitry.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

In various embodiments, the input device (100) may include one or more sensor electrodes configured for both display updating and input sensing. For example, at least one sensor electrode that is used for input sensing may comprise one or more display electrodes of the display device that are used in updating the display. Further, the display electrode may include one or more of segments of a Vcom electrode (common electrodes), source drive lines (electrodes), gate line (electrodes), an anode sub-pixel electrode or cathode pixel electrode, or any other display element. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the display electrode can also be referred to as a "combination electrode", since it performs multiple functions. In various embodiments, each of the sensor electrodes includes one or more display electrodes associated with a pixel or sub pixel. In other embodiments, at least two sensor electrodes may share at least one display electrode associated with a pixel or sub-pixel.

In various embodiments, a first sensor electrode includes one or more display electrodes configured for display updating and capacitive sensing and a second sensor electrode may be configured for capacitive sensing and not for display updating. The second sensor electrode may be disposed between substrates of the display device or external from the display device. In some embodiments, all of the sensor electrodes may include one or more display electrodes configured for display updating and capacitive sensing.

Processing system (110) may be configured to perform input sensing and display updating during at least partially overlapping periods. For example, a processing system (110) may simultaneously drive a first display electrode for both display updating and input sensing. In another example, processing system (110) may simultaneously drive a first display electrode for display updating and a second display electrode for input sensing. In some embodiments, processing system (110) is configured to perform input sensing and display updating during non-overlapping periods. The non-overlapping periods may be referred to as non-display update periods. The non-display update periods may occur between display line update periods of common display frame and be at least as long as a display line update period. Further, the non-display update periods may occur between display line update periods of a common display frame and be one of longer than or shorter than a display line update period. In some embodiments, the non-display update periods may occur at the beginning of a display frame and/or between display frames. Processing system (110) may be configured to drive one or more of the sensor electrodes and/or the display electrodes with a shield signal. The shield signal may comprise one of a constant voltage signal or a varying voltage signal (guard signal). Further, one or more of the sensor electrodes and/or display electrodes may be electrically floated.

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
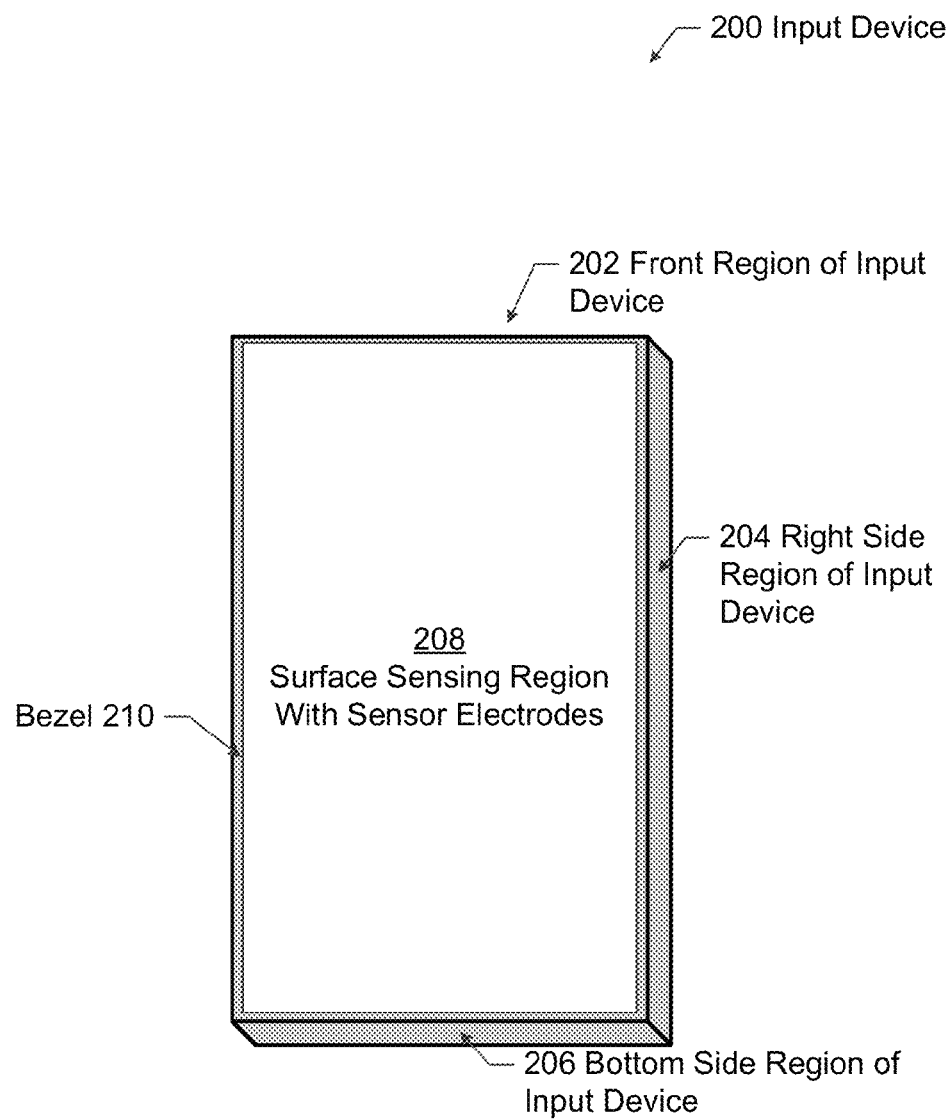

FIG. 2 shows a diagram of an example input device (200) in accordance with one or more embodiments of the invention. The diagram of FIG. 2 is for explanatory purposes only. The dimensions, shape, and curvature of the input device (200) may vary without departing from the scope of the invention. As shown in FIG. 2, the input device (200) has a front region (202), side regions (e.g., right side region of input device (204), bottom side region of input device (206)), and a back region of the input device (not shown).

The front region (202) may include a surface sensing region with sensor electrodes (208) that is surrounded by a bezel (210). The sensor electrodes may correspond to the sensor electrodes discussed above with reference to FIG. 1. The surface sensing region (208) is a portion of the sensing region that may be touched by a person. For example, the surface sensing region may correspond to a transparent covering (e.g., glass or other material) above a display. The sensor electrodes may be below the transparent covering and within the input device (200). In one or more embodiments of the invention, for equal size input objects, resulting signals from performing capacitive sensing are strongest on the surface sensing region (208). In one or more embodiments of the invention, a bezel (210) may surround the surface sensing region (208) and may frame the transparent covering. Sensing electrodes may be omitted from the bezel.

As shown in FIG. 2, the front region (202) is connected to side regions (e.g., right side region of input device (204), bottom side region of input device (206)) of the input device (200). In particular, the side regions connect the front region to the back region, which is substantially parallel to the front region. The side region may be substantially orthogonal to the front region and to the back region. In some embodiments, substantially orthogonal is completely orthogonal (e.g., as shown in FIG. 2). In other embodiments, substantially orthogonal may be curved and a virtual line connecting the start of the side at the front region and the end of the side at the back region is orthogonal to the front region. Further, the side may include multiple components. The side may be formed as a single piece of material with the front region, a single piece of material with the back region, and/or both regions.

Various configurations of input devices exist or may be used. One or more embodiments are not limited to the above described configuration. For example, in some embodiments, the bezel may be omitted. In some embodiments, the front region and/or the back region is curved. Further, although FIG. 2 shows an input device that appears as a smart phone, other types of input devices may be used without departing from the scope of the invention.

Figure 3:
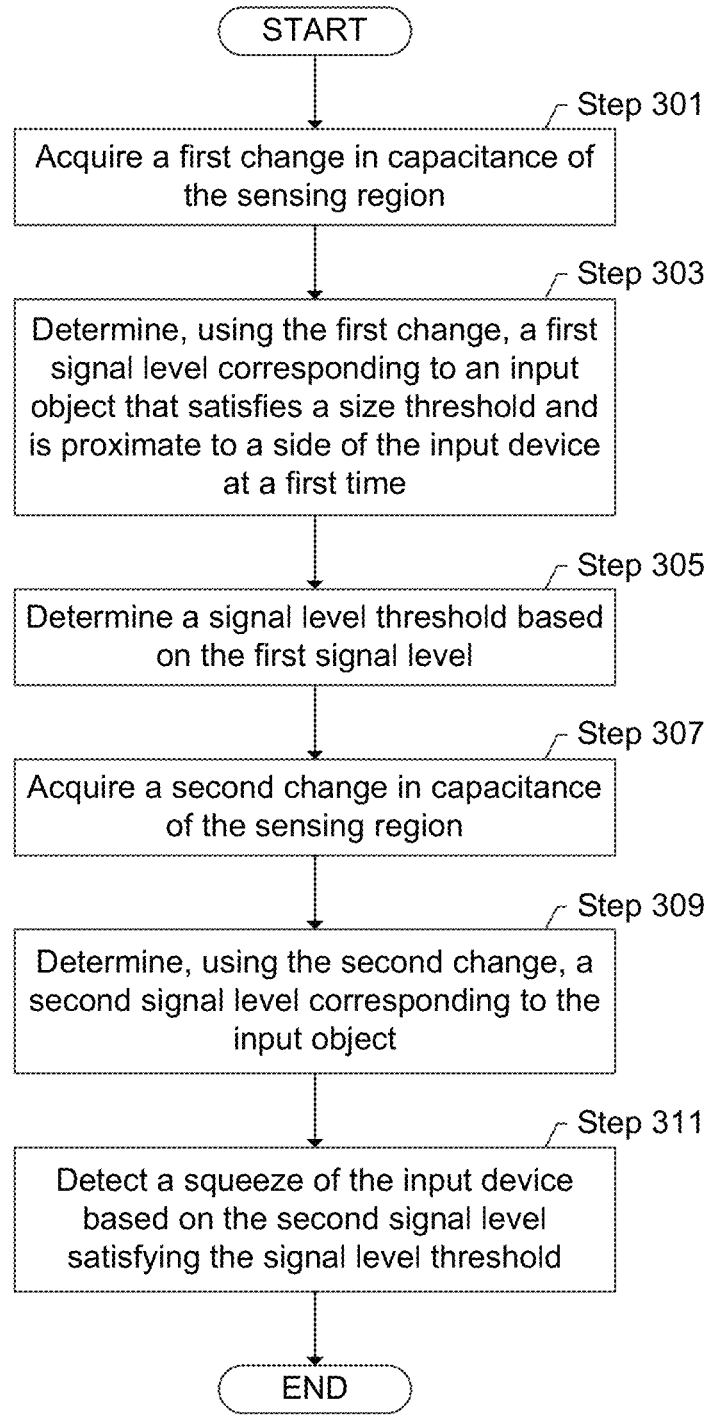
FIGS. 3 and 4 are example flowcharts in accordance with one or more embodiments of the invention.
Figure 4:
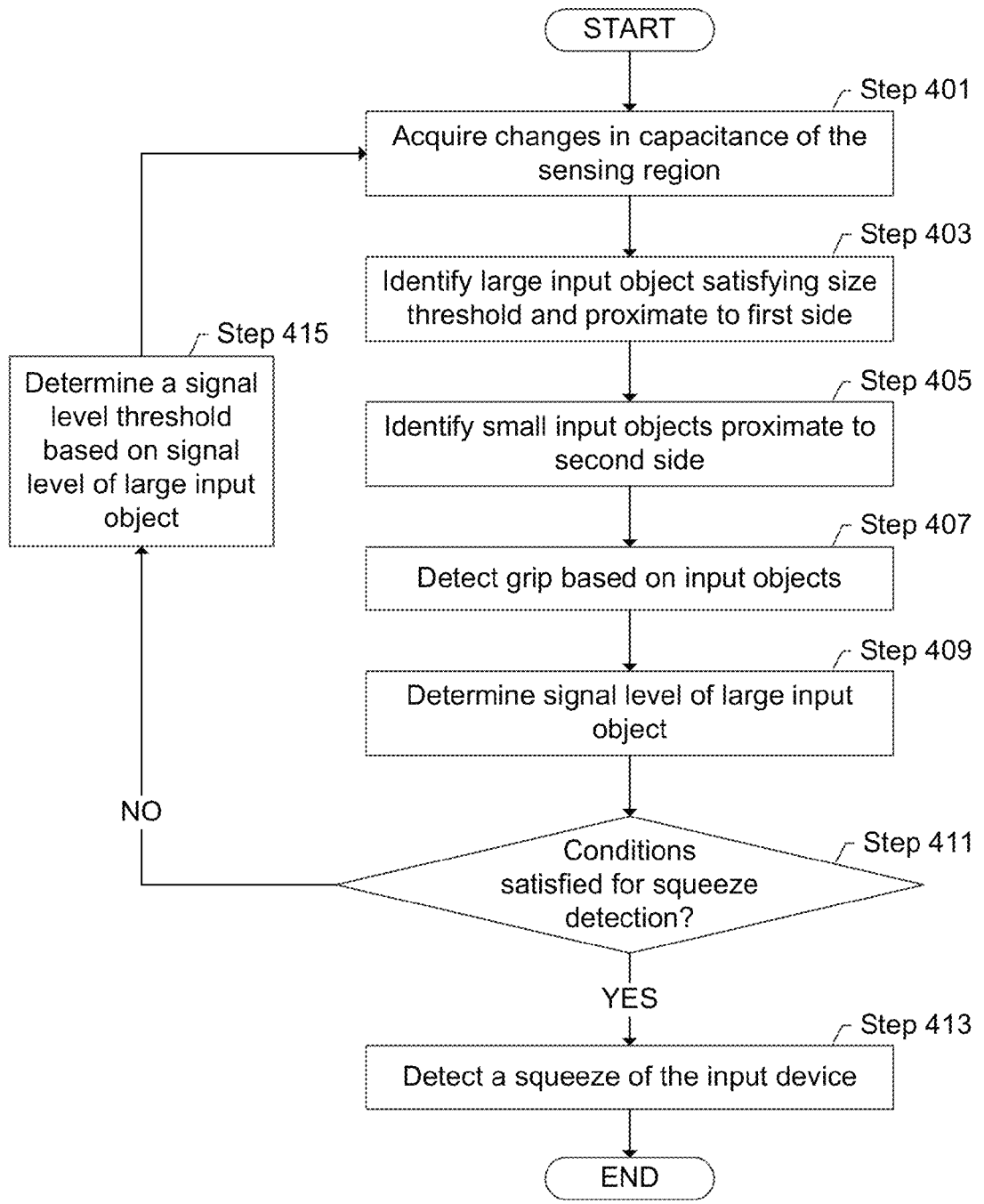

Turning to the flowcharts, FIGS. 3 and 4 show flowcharts for grip management in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a general flowchart for grip management in accordance with one or more embodiments of the invention. In Step 301 of FIG. 3, a first change of capacitance of the sensing region is acquired in accordance with one or more embodiments of the invention. In one or more embodiments, capacitive sensor data is obtained, such as directly or indirectly using sensor circuitry. For example, the capacitive sensor data may be obtained using the sensor circuitry and sensor electrodes. In the example, the sensor circuitry may drive or modulate the sensor electrodes with respect to a reference voltage. Based on the modulating, the sensor circuitry may detect the absolute capacitance of the sensor electrodes, which may be affected by any input object and/or background capacitance. By way of another example, mutual capacitance sensor data may be obtained by the sensor circuitry driving transmitter electrodes with transmitter signals and receiving resulting signals using receiver electrodes. Like absolute capacitance, the resulting signals are affected by input objects and/or background capacitance. The change in capacitance reflects the amount of the resulting signal that is attributable to an input object rather than the original modulating of the sensor electrode or the background capacitance. Preprocessing may be performed on the capacitive sensor data. For example, the preprocessing may be to apply temporal and/or spatial filters, subtract a baseline, or perform any other operations.

In Step 303, using the first change, a first signal level corresponding to an input object that satisfies a size threshold and is proximate to the side of the input device at a first time is determined. In one or more embodiments, positional information for input objects in the sensing region is obtained. Obtaining the positional information may include determining which portions of the capacitive sensor data obtained satisfy a detection threshold that indicates a presence of an input object. Based, at least in part, on the locations of the sensor electrodes that captured the capacitive sensor data satisfying the detection threshold, the position of the input object may be determined. In at least some embodiments, the magnitude of the change in capacitance may be used to determine positional information. The positional information may further include determining the size of the input object, such as based on the number of sensor electrodes exhibiting changes in capacitance that indicate a presence of an input object and, according to some embodiments, the relative signal level of the sensor electrodes exhibiting changes. Determining positional information may include combining information from multiple sensing methods.

Continuing with Step 303, the location of the input object is determined. If the input object is determined to be at the edge of the sensing region, the bezel, or the side, then the flow may proceed. Further, the size of the input object is compared to a size threshold. The size threshold may be a predefined threshold, a dynamic threshold, and/or a configurable threshold. For example, the size threshold may be defined in instructions for grip detection, set during training by a user, set based on use by a user, set at another time, or any combination thereof. In one or more embodiments, the size threshold is the minimum size at which a palm at the edge of the sensing region, the bezel, or the side is detected. For example, the size threshold may be for a portion of a human palm, such as the base of the thumb.

In Step 305, a first signal level threshold is determined based on the first signal level in accordance with one or more embodiments of the invention. In one or more embodiments of the invention, a squeeze has a greater signal level over a grip as more portions of the user's hand may affect the sensing region. In one or more embodiments of the invention, the first signal level threshold reflects an amount of change in the change in capacitance by which a squeeze is detected from a grip. In other words, the first signal level threshold is set to distinguish a continued grip from a squeeze. Because different users may have different size hands and different holding techniques, and such differences may change over time, the first signal level threshold may dynamically change.

Determining the first signal level threshold may use a single capacitive frame or multiple capacitive frames. For example, the signal level threshold may be performed by combining the signal level corresponding to the same input object in the same portion of the sensing region over a number of consecutive capacitive frames including the capacitive frame determined in Step 303. The combining may be a weighted average, an average, or another technique. The number of capacitive frames may be predefined and/or configurable. For example, the signal level threshold may be set as a certain percentage more than the signal level determined in Step 303 or the combined signal level. By way of a more concrete example, the first signal level threshold may be 110% multiplied by the first signal level. By way of another concrete example, the first signal level threshold may be 110% multiplied by the combined signal level of the previous n capacitive frames for the input object.

In Step 307, a second change in capacitance of the sensing region is acquired in accordance with one or more embodiments of the invention. In Step 309, using the second change, a second signal level corresponding to the input object is determined in accordance with one or more embodiments of the invention. Steps 307 and 309 may be performed in a same or similar manner to Steps 301 and 303 discussed above. In one or more embodiments of the invention, the system matches the input object from the current capacitive frame to the input object in one or more prior capacitive frames. For example, if the input object is substantially the same size, substantially the same location, then the input object may be determined to be the same input object. Other factors may be used to determine that the input object is the same input object. Thus, the input object satisfying the size threshold and located proximate to the side determined in Step 309 is matched to the input object determined in Step 303. In one or more embodiments, based on the determination that the input object is the same in consecutive capacitive frames, the method proceeds to Step 311.

In Step 311, a squeeze of the input device based on the second signal level satisfying the signal level threshold is detected in accordance with one or more embodiments of the invention. In particular, the signal level of the input object is compared to the signal level threshold. If the signal level is determined to satisfy the signal level threshold, then the system may determine that a squeeze is performed. Satisfying the signal level threshold may be that the signal level is greater than the signal level threshold. If greater negative values indicate a greater magnitude of signal level, then satisfying the signal level threshold may be less than the signal level threshold. Other techniques for satisfying a threshold may be used without departing from the scope of the invention.

Additional conditions may be used to detect a grip and a squeeze in accordance with one or more embodiments of the invention. FIG. 4 shows a flowchart for grip management using additional conditions in accordance with one or more embodiments of the invention. In one or more embodiments, Steps 401-411 are performed for each capacitive frame. In Step 401, changes in capacitance of the sensing region are acquired in accordance with one or more embodiments of the invention. Step 401 may be performed in a similar manner discussed above. In Step 403, a large input object satisfying a size threshold and proximate to the first side is identified in accordance with one or more embodiments of the invention. In particular, the large input object is any input object satisfying the size threshold. For example, the large input object may correspond to the base of the palm.

In Step 405, one or more small input objects proximate to a second side are identified. The second side may be the side opposite the first side. For example, if the first side is the left side, the second side may be the right side. Conversely, if the first side is the right side, the second side may be the left side. The second side may be an adjacent side without departing from the scope of the invention. In one or more embodiments, the system determines whether multiple smaller input objects exist. The smaller input objects may be input objects that each individually satisfies a static or dynamic small size threshold. By way of another example, the smaller input objects may be any input objects that are smaller than the large input object. Further, the determination of being smaller may be with respect to one or two dimensions in accordance with one or more embodiments of the invention. For example, the size comparison may consider only the width of the input objects. By way of another example, the size comparison may detect the total area of the input objects. By way of another example, the size comparison may compare the respective signal levels of each input object. In one or more embodiments, the system may check for multiple smaller input objects. In other embodiments, a single smaller input object is sufficient to satisfy the additional conditions of the embodiments described in FIG. 4.

In Step 407, a grip is detected based on the input objects in accordance with one or more embodiments of the invention. In one or more embodiments of the invention, based at least in part on an input object satisfying a size threshold being on the first side, and smaller input objects being on a second side, the system determines that a grip of the input device is being performed. The grip may be a user holding the input device.

In Step 409, a signal level of the large input object is determined. Determining the signal level may be performed as discussed above with reference to FIG. 3.

In Step 411, a determination is made whether the conditions are satisfied for squeeze detection. Different conditions may be used to detect the squeeze in accordance with one or more embodiments of the invention. The various conditions may be combined in virtually any manner. For example, one or more embodiments may use some, but not all conditions. In some embodiments, conditions may be alternatives of each other. The conditions may include, for example, the signal level of large input object being greater than the signal level threshold. Determining whether the signal level is greater than the signal level threshold may be performed as discussed above with reference to FIG. 3. By way of another example condition, a squeeze may be detected based in part on the number of consecutive capacitive frames of a grip detected being greater than a threshold. In other words, rather than detecting a squeeze when a user is in the process of picking up the input device, the system may wait until the user is determined to be gripping the input device for a predefined number of capacitive frames.

By way of another example, detecting a squeeze may be based in part on a pause in the movement of the input objects in the sensing region. For example, when a user is gripping the input device, the user may move the smaller input objects in relation to the sensing region. Thus, the resulting locations of the input objects with respect to the sensing region may change. However, when the user transitions to a squeeze, the user may stop moving the smaller input objects. Thus, the smaller input objects may be detected as being in substantially the same location over a certain number of capacitive frames. If the number of capacitive frames satisfies a pause threshold indicating that the user has paused moving the smaller input objects, the system may use the detected pause, in part, to detect that the user is performing a squeeze. Detecting removal of a squeeze within the time limit may be indicative of a purposeful squeeze by the user rather than unintentional increase in pressure of the user's grip that may last a longer period of time.

By way of another example, detecting a squeeze may be based in part on removal of the squeeze within a time limit. For example, the system may identify that the signal level of the large input object satisfies the signal level threshold. The system may further detect when the signal level of the large input object no longer satisfies the same or a different signal level threshold, and a grip is still detected. For example, the system may have a separate signal level threshold for removing than the signal level threshold to detect the squeeze. The signal level threshold for removing may be based at least in part on the signal level of the large input object when the squeeze is detected. For example, removal may be 90% of the signal level of the squeeze.

In some embodiments, the system may use a pause in movement and/or consecutive capacitive frames of grip to start to determine the squeeze. If the time capacitive frame in which the signal level of the large input object stops satisfying the signal level threshold is within the time limit, then the system may detect that the user has just performed a squeeze. In such a scenario, the system may distinguish a squeeze from a harder grip.

In one or more embodiments of the invention, if the conditions are satisfied for a squeeze detection, then the squeeze is detected in Step 413. The detection of the squeeze may be reported to the host device, such as to a host processor or a software application. The detection may be reported as the performance of a gesture. In one or more embodiments of the invention, the corresponding user interface action that corresponds to the squeeze may be reported. For example, the detection of the squeeze may cause a user interface action to be performed. The user interface action may be to change the power state of the host device. For example, squeeze detection may be used to change the host device from a low power mode (e.g., sleep mode) to a higher power mode (e.g., wake mode). The user interface action may be to take a picture. The user interface action may be to open a software application or update a display on the host device. Other types of user interface actions may be performed without departing from the scope of the invention.

In Step 415, if a squeeze is not detected, then a signal level threshold is determined based on the signal level of the large input object in accordance with one or more embodiments of the invention. Determining the signal level threshold may be performed as discussed above with reference to Step 305 of FIG. 3. The system may proceed to Step 401 for processing the next capacitive frame in accordance with one or more embodiments of the invention.

Although not shown in FIGS. 3 and 4, when a user releases a grip on the input device, the signal level threshold may be reset. In other words, the signal level threshold from a prior occurrence of a user gripping the input device may be cleared so as to not affect the threshold for the next gripping of the input device. In other embodiments, the clearing of the threshold is not performed when the grip is no longer detected.

Figure 5:
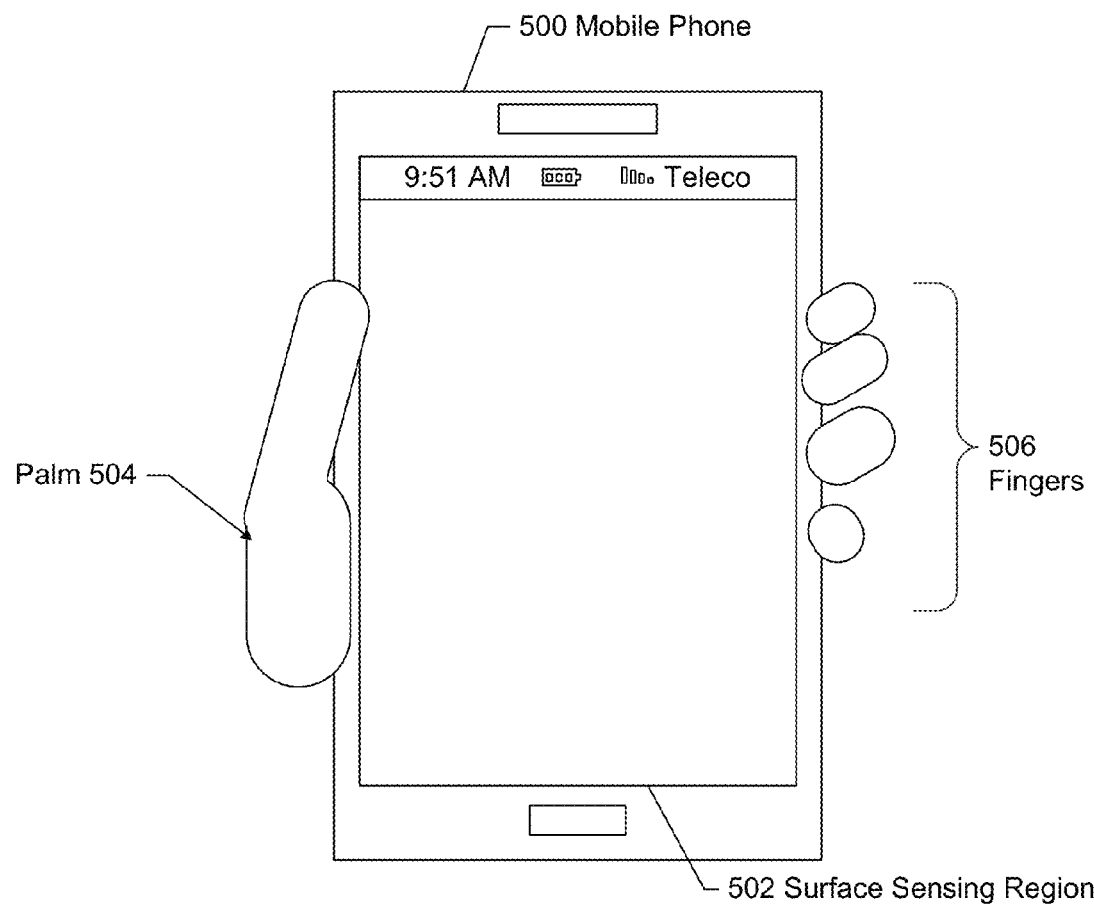
FIG. 5 is an example in accordance with one or more embodiments of the invention.

FIG. 5 shows an example in accordance with one or more embodiments of the invention. The following example is for explanatory purposes only and not intended to limit the scope of the invention. In particular, in the example of FIG. 5, the user is holding a mobile phone (500) in the user's left hand. The surface sensing region (502) is underneath or part of the display with an application. As shown, the user's palm (504) and some of the user's fingers (506) may not be on the surface sensing region (502). Nevertheless, with the proximity sensing, the palm (504) and the fingers (506) are detectable.

Continuing with the example, as the user is walking, the user may be holding the mobile phone (500) to the user's side. The user swings the mobile phone (500) naturally as the user's arm moves back and forth. Further, the user may continually and unintentionally adjust the positioning of the user's fingers (506). The user may also adjust the positioning of the user's palm (504). Because of the respective locations and the size of the input objects (e.g., palm (504), fingers (506)), during the swinging motion, the system detects a grip. In particular, the system may first check that the palm is still present within a threshold distance to the location of the palm of the prior capacitive frame. The system may then confirm that the fingers (506) are present. With each capacitive frame, the system may update the signal level threshold by which the squeeze is detected.

Continuing with the example, when the user wants to use the mobile phone (500), the user may lift the phone up. The user may initiate a squeeze of the phone to change the phone from the low power mode to a high power mode. In particular, the user's fingers (506) may stop moving and the user may perform a temporary tighter grip on the phone (500). Because of the greater contact and/or proximity of the palm (504) to the mobile phone (500), the signal level caused by the palm (504) may increase. Thus, the system determines that the palm (504) has satisfied the signal level threshold. The system may further confirm that the fingers (506) remain on the opposing side of the mobile phone. The system may further use the pause in positioning of the fingers (506), the temporary nature of the increased signal level, and other conditions to detect that the squeeze was performed.

Because of the squeeze, the mobile phone transitions from the low power mode. In the example, an integrated circuit for the capacitive sensing, device driver, host operating system, and/or other component, may notify the mobile phone (e.g., application, host processor, and/or other component) that a squeeze and/or gesture is performed. The mobile phone switches from low power mode and may update an application accordingly.

In some embodiments, the squeeze is assigned to taking a picture. In such embodiments, through the capacitive sensing, the user may take a picture without identifying a physical button or software button to press. The above are only examples. Different embodiments may use squeeze detection to perform other operations. As shown, the ability to detect the squeeze may increase the usability of the mobile device. For example, because the user may also use a squeeze as a gesture, the user may not be limited to particular gestures performed on the sensing region, or to using software or hardware buttons.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system configured for grip management, the processing system comprising:
sensor circuitry with functionality to:
acquire, using a plurality of sensor electrodes, a first plurality of changes of capacitance of a sensing region of an input device, and
acquire a second plurality of changes of capacitance of the sensing region using the plurality of sensor electrodes; and
processing circuitry with functionality to:
determine, using the first plurality of changes, a first signal level corresponding to a first input object satisfying a size threshold and being proximate to a first side of the input device at a first time,
determine a first signal level threshold based on the first signal level,
determine, using the second plurality of changes, a second signal level corresponding to the first input object being proximate to the first side of the input device at a second time,
detect a release of a squeeze, and
detect the squeeze of the input device based at least in part on the second signal level satisfying the first signal level threshold, and on the release being within a time threshold of the second signal level satisfying the first signal level threshold.

2. The processing system of claim 1, wherein the processing circuitry is further configured to:
determine, using the second plurality of changes, a plurality of input objects being proximate to a second side of the input device at the second time,
wherein the squeeze is further detected based on the plurality of input objects being proximate to the second side of the input device at the second time.

3. The processing system of claim 2, wherein the first input object is detected as being larger than each input object in the plurality of input objects.

4. The processing system of claim 2, wherein the squeeze is further detected based on the first input object and the plurality of input objects being present for a plurality of capacitive frames.

5. The processing system of claim 1, wherein the sensor circuitry is further configured to:
acquire a third plurality of changes of capacitance of the sensing region using the plurality of sensor electrodes, and
wherein the processing circuitry is further configured to:
determine, using the third plurality of changes, a third signal level corresponding to the first input object being proximate to the first side of the input device at a third time, and
detect the release of the squeeze based at least in part on the third signal level satisfying a third signal level threshold.

6. The processing system of claim 1, wherein the processing circuitry is further configured to:
report the squeeze to a host device.

7. The processing system of claim 1, wherein the processing circuitry is further configured to:
change a power state of a host device in response to detecting the squeeze.

8. The processing system of claim 1, wherein the processing circuitry is further configured to:

report a gesture corresponding to a user interface action in response to the detecting of the squeeze.

9. A method for grip management comprising:
determining, using a first plurality of changes of capacitance of a sensing region of an input device, a first signal level corresponding to a first input object satisfying a size threshold and being proximate to a first side of the input device at a first time;
determining a first signal level threshold based on the first signal level;
determining, using a second plurality of changes of capacitance of the sensing region, a second signal level corresponding to the first input object being proximate to the first side of the input device at a second time;
detect a release of a squeeze; and
detecting the squeeze of the input device based at least in part on the second signal level satisfying the first signal level threshold, and on the release being within a time threshold of the second signal level satisfying the first signal level threshold.

10. The method of claim 9, further comprising:
determining, using the second plurality of changes, a plurality of input objects being proximate to a second side of the input device at the second time,
wherein the squeeze is further detected based on the plurality of input objects being proximate to the second side of the input device at the second time.

11. The method of claim 10, wherein the first input object is detected as being larger than each input object in the plurality of input objects.

12. The method of claim 10, wherein the squeeze is further detected based on the first input object and the plurality of input objects being present for a plurality of capacitive frames.

13. The method of claim 9, further comprising:
determining, using a third plurality of changes of capacitance of the sensing region, a third signal level corresponding to the first input object being proximate to the first side of the input device at a third time, and
detecting the release of the squeeze based at least in part on the third signal level satisfying a third signal level threshold.

14. The method of claim 9, further comprising:
reporting the squeeze to a host device.

15. The method of claim 9, further comprising:
changing a power state of a host device in response to detecting the squeeze.

16. The method of claim 9, further comprising:
reporting a gesture corresponding to a user interface action in response to the detecting of the squeeze.

17. An input device for grip management comprising:
a plurality of sensor electrodes; and
a processing system configured to:
acquire, using the plurality of sensor electrodes, a first plurality of changes of capacitance of a sensing region of an input device,
determine, using the first plurality of changes, a first signal level corresponding to a first input object satisfying a size threshold and being proximate to a first side of the input device at a first time,
determine a first signal level threshold based on the first signal level,
acquire a second plurality of changes of capacitance of the sensing region using the plurality of sensor electrodes, determine, using the second plurality of changes, a second signal level corresponding to the first input object being proximate to the first side of the input device at a second time,
detect a release of a squeeze, and
detect the squeeze of the input device based at least in part on the second signal level satisfying the first signal level threshold, and on the release being within a time threshold of the second signal level satisfying the first signal level threshold.

18. The input device of claim 17, wherein the processing system is further configured to:
determine, using the second plurality of changes, a plurality of input objects being proximate to a second side of the input device at the second time,
wherein the squeeze is further detected based on the plurality of input objects being proximate to the second side of the input device at the second time.

* * * * *